US011873045B2

(12) United States Patent
Payne

(10) Patent No.: US 11,873,045 B2
(45) Date of Patent: Jan. 16, 2024

(54) TRAILERED RECREATION CART

(71) Applicant: Lee Payne, Townsend, MT (US)

(72) Inventor: Lee Payne, Townsend, MT (US)

(*) Notice: Subject to any disclaimer, the term of this patent is extended or adjusted under 35 U.S.C. 154(b) by 937 days.

(21) Appl. No.: 16/873,428

(22) Filed: Apr. 10, 2020

(65) Prior Publication Data

US 2021/0316804 A1 Oct. 14, 2021

(51) Int. Cl.
| | | |
|---|---|---|
| *B62D 63/06* | (2006.01) | |
| *B60K 1/04* | (2019.01) | |
| *B60D 1/24* | (2006.01) | |
| *B62D 63/08* | (2006.01) | |
| *B60J 7/12* | (2006.01) | |
| *B60P 3/34* | (2006.01) | |
| *B62B 5/06* | (2006.01) | |
| *B62B 5/00* | (2006.01) | |
| *B62D 59/04* | (2006.01) | |
| *B62B 3/12* | (2006.01) | |
| *B62B 3/02* | (2006.01) | |
| *B62K 27/00* | (2006.01) | |

(52) U.S. Cl.
CPC ........... *B62D 63/061* (2013.01); *B60D 1/249* (2013.01); *B60J 7/1291* (2013.01); *B60K 1/04* (2013.01); *B60P 3/343* (2013.01); *B62B 3/02* (2013.01); *B62B 3/12* (2013.01); *B62B 5/0033* (2013.01); *B62B 5/06* (2013.01); *B62D 59/04* (2013.01); *B62D 63/08* (2013.01); *B62B 2202/402* (2013.01); *B62K 27/003* (2013.01)

(58) Field of Classification Search
CPC ...... B62D 63/061; B62D 59/04; B62D 63/08; B62D 63/06; B60D 1/249; B60J 7/1291; B60K 1/04; B60P 3/343; B62B 3/02; B62B 3/12; B62B 5/0033; B62B 5/06; B62B 2202/402; B62K 27/003
USPC ......................................................... 180/216
See application file for complete search history.

(56) References Cited

U.S. PATENT DOCUMENTS

| | | | | |
|---|---|---|---|---|
| 1,017,983 | A * | 2/1912 | Long | ............................... 280/37 |
| 5,020,814 | A * | 6/1991 | George | ................ B62K 27/003 |
| | | | | 280/401 |
| 5,460,307 | A * | 10/1995 | Stevenson | .................. A45F 4/02 |
| | | | | 280/30 |
| 5,785,333 | A * | 7/1998 | Hinkston | ................ B62K 27/16 |
| | | | | 280/647 |
| 5,979,921 | A * | 11/1999 | Derven | ................ B62K 15/006 |
| | | | | 280/491.1 |
| 6,896,275 | B1 * | 5/2005 | Liu | ......................... B62K 27/12 |
| | | | | 280/204 |

(Continued)

*Primary Examiner* — James A Shriver, II
*Assistant Examiner* — Hilary L Johns
(74) *Attorney, Agent, or Firm* — Douglas Tschida

(57) ABSTRACT

A cart assembly adapted for manual, bicycle and/or motorized vehicle towing. Multiple frame sections are coupled to pivot between completely collapsed, partially open and completely open positions to facilitate, travel, storage and sleeping. A pair of axle plates support primary wheels to the framework and a drive axle between adjacent cross-brace arms. A handle frame section, saddle arms, truss arms, resilient spreader arms, auxiliary caster wheel, battery powered electric drive motor(s), fabric cover and/or hard cover mount to the framework. A resilient, reciprocating shock absorbing tow bar or tongue arm assembly provides flexibly resilient pieces to absorb travel shock between the cart and tow vehicle.

20 Claims, 16 Drawing Sheets

(56) References Cited

U.S. PATENT DOCUMENTS

| | | | | |
|---|---|---|---|---|
| 7,445,222 B2* | 11/2008 | Bell | ........................ | B62K 27/02 |
| | | | | 280/204 |
| 7,823,906 B2* | 11/2010 | Darling, III | ......... | A61G 1/0225 |
| | | | | 280/651 |
| 8,091,908 B2* | 1/2012 | Wilson | .................... | B62K 27/12 |
| | | | | 280/204 |
| 8,123,241 B1* | 2/2012 | Chen | .................... | B62K 27/003 |
| | | | | 280/204 |
| 8,444,173 B1* | 5/2013 | Liu | ...................... | B62K 27/003 |
| | | | | 280/656 |
| 8,714,111 B2* | 5/2014 | Bryson | ................ | A01K 1/0245 |
| | | | | 119/482 |
| 10,517,265 B2* | 12/2019 | Lin | ........................... | B62B 3/02 |
| 2003/0127835 A1* | 7/2003 | Shapiro | .................... | B62B 3/007 |
| | | | | 280/656 |
| 2013/0014794 A1* | 1/2013 | Jin | ........................... | E04H 15/46 |
| | | | | 24/595.1 |
| 2013/0249176 A1* | 9/2013 | Bengtzen | .................... | B62B 1/20 |
| | | | | 280/30 |
| 2014/0131963 A1* | 5/2014 | Bengtzen | ............... | A45B 23/00 |
| | | | | 280/32 |
| 2015/0274186 A1* | 10/2015 | Treadwell | ............... | B62B 3/007 |
| | | | | 280/651 |
| 2018/0132446 A1* | 5/2018 | Jakubowski | ............ | B62B 7/105 |
| 2020/0189684 A1* | 6/2020 | Engel | .................... | B62K 27/003 |

* cited by examiner

TRAILERED RECREATION CART

BACKGROUND OF THE INVENTION

The present invention relates to a cart having a resilient suspension and chassis that can support a variety of vehicle body types and that can be towed with a recreational vehicle (e.g. all-terrain vehicle (ATV), bicycle, or motorcycle), can be hand pushed/pulled over paved or off-road surfaces, can haul a variety of recreational equipment, and can be folded into multiple positions and can include a tent or sleeping enclosure.

A variety of trailers have been developed for coupling to motorcycles, bicycles and all-terrain vehicles. Most typically, open frame trailer attachments are configured to contain passengers and/or assorted paraphernalia. Closed frame trailers with hard covers can carry equipment. These types of trailers are typically designed for towing with motor powered tow vehicles such as ATV's and motorcycles. The trailers provide rigid tongue arms that couple with lynch pins mounted through overlapping bores at coupler mounts fitted to the vehicle and trailer. Most typically, these assemblies provide bodies having one or more formed fiberglass or metal panels.

A variety of bicycle towed trailers are known that are configured to contain children. Fabric and screen covered passenger compartments are provided to protect the children from sun, insects and road debris. Such trailers are adapted with extended tow bars or tongue arms and linkages that mount to the bicycle, for example, the bicycle's rear axle or frame or a bicycle's seat pedestal. The tow bars or tongue arms are constructed to be generally rigid except at the vehicle mounting linkage where they are adapted to rotate and pivot with the towing vehicle movement to permit turning or laying the bicycle on the ground. They are not adapted to reduce or transfer road/terrain induced shock to the trailer.

A variety of equipment stroller-type equipment buggies and "game haulers" used to transport equipment and/or harvested game animals also exist that provide a folding framework having a hand gripping member for pulling/pushing the assembly and harvested game and/or equipment. Such frameworks typically provide two folding frame sections, a forward hand grip frame section and a trailing two-wheel supported frame section. The wheel supported frame section includes an axle for supporting a pair of wheels that may be permanently mounted or may detach to permit collapsing the assembly for transport in a truck or car or in the fashion of a "backpackable" assembly. These stroller-type assemblies may include an auxiliary caster wheel. Straps or webbing members can be fitted to the frame sections to facilitate supporting and/or securing any hauled animal or cargo.

In distinction to known cart assemblies, the recreational cart of the present invention is adaptable to manual, bicycle or motorized vehicle towing. The cart is also configurable into multiple positions to accommodate a wide variety of recreational activities. The trailered cart assembly of the invention includes at least first and second frames that are coupled together to pivot between multiple positions. A pair of primary wheels are supported to the framework at a protected cross axle pivot assembly. An axle extends through laterally opposed, cross braced pivot plates. The frame sections are mounted to pivot at the pivot plates. The frame sections can be pivoted and secured in several different positions between completely flat, partially open and completely open positions. A fiberglass, paneled or fabric tent-like cover can be secured to and fold with the framework sections.

A push/pull handle frame section, saddle arms, truss arms, resilient spreader arms, an auxiliary caster wheel and/or battery powered electric motors mount to the framework to accommodate motorized and/or non-motorized use. In some assembly configurations, a hard cover shell is included.

When configured for towing, a resilient, shock absorbing trailer tongue arm assembly can be mounted between the tow vehicle and cart framework. A forward end of the resilient tow arm or tongue arm includes a coupler that secures to the tow vehicle. An aft end of the tow bar or tongue arm is secured to the framework and is mounted for reciprocating and/or telescoping relative motion with respect to the cart. An intervening resilient coupler piece (e.g. spring(s), elastomer member(s), pneumatic piston or the like) is particularly provided at the tongue arm or secured to the vehicle to provide shock absorption between the trailered cart and tow vehicle. Travel stress to the cart framework and stored cargo/passenger from bumps, ruts and fits and starts from the tow vehicle is thereby reduced as the trailing cart assembly is towed over rough terrain.

SUMMARY OF THE INVENTION

It is a primary object of the invention to provide a multi-section, multi-position cart that can be towed or can be hand pushed/pulled over paved or off-road surfaces.

It is a further object of the invention to provide a cart having a horizontal frame section and a pivoting frame coupled together at opposed pivot plates that are secured together with cross members and a continuous cross axle.

It is a further object of the invention to provide first and second frame sections and intervening U-shaped saddle pieces pivotally mounted to the opposed pivot plates.

It is a further object of the invention to provide a cart having rigid, for example, fabric panels containing door, window, vent openings etc. mounted to the framework assembly to protect cargo or shelter sleeping users.

It is a further object of the invention to provide opposed, acutely extending truss brace arms that mount to the first and second frame sections and/or U-shaped saddle arms to retain the fabric panels in an expanded or deployed condition to provide a weather tight interior space when the frame sections are deployed for sleeping.

It is a further object of the invention to provide resilient brace arm(s) or stays to separate the frame sections and saddle arms and stabilize and/or stretch the supported panels.

It is a further object of the invention to provide a cart having externally mounted brackets secured to various frame sections, frame members and/or truss brace arms to support hunting, fishing or camping equipment (e.g. firearms, fishing rods, etc.) for travel.

It is a further object of the invention to provide a cart having a hard cover secured to the framework to protect the frame sections and cover sundry on-board items during transport and deploy when the framework is opened into a "bed or sleeping" position.

It is a further object of the invention to provide a cart having a resilient tow bar or tongue arm and linkage that mounts to a towed wheel supported framework and which tow bar is mounted in a resilient, reciprocating or telescoping fashion relative to a couplings to the cart and tow vehicle to minimize the transfer of travel stress to the cart.

It is a further object of the invention to provide a cart having a handle frame section and/or an auxiliary support wheel adapted to permit manual push/pull cart travel.

It is a further object of the invention to provide one or more battery powered electric motors and linkages to drive included drive or auxiliary wheels.

The foregoing objects, advantages and distinctions of the invention are obtained in a multi-section cart framework supported from a pair of opposed primary wheels and as desired an auxiliary pivoting caster wheel. The frame sections and associated U-shaped saddle and brace arms are mounted to pivot between a partially raised travel/cargo storage position, a fully-rotated open/bed or sleeping position and a fully folded-flat travel position. The frame sections and saddle arms pivot at opposed axle or pivot plates separated by a cross axle and adjacent cross arm members that also protect the axle. A resilient tow arm linkage mounts to the cart assembly to expand and contract in a resilient, reciprocating or telescoping fashion to reduce cart travel stresses when towed.

The cart assembly of the invention includes at least first and second frame sections that are coupled to pivot at opposed axle plates between the multiple predetermined positions. A pair of primary wheels are supported to the framework at one/or more cross axles that extend through and rotate within the laterally opposed axle plates. Parallel mounted cross arms extend between the axle plates on opposite sides of the axle. One or more battery powered electric motors can be adapted to mount to the framework in association with the axle to selectively power one or both of the primary wheels and/or the auxiliary wheel.

The frame sections are fastened to the axle plates and can presently be pivoted to at least three different primary predetermined positions. In a horizontal bed/sleeping position, the pair of frame sections deploy to a horizontally flat condition and are supported to permit sleeping on the framework. In an intermediate travel position, a pivoting frame section can be elevated relative to the other horizontal section (e.g. 110° to) 145°. The pair of primary support wheels support the cart. A detachable caster wheel adds additional support and facilitates the maneuverability of the cart. In a collapsed travel position, the pivoting forward frame section is folded flat to overlie the other wheel supported horizontal frame section.

A fabric tent-like cover can be attached to the frame sections and can expand and contract with the frame sections. The fabric cover provides several panels and fasteners or sleeves that fasten to the frame sections and the intervening saddle arms and stabilizer truss brace arms. The U-shaped saddle arms and stabilized truss brace arms are arrayed to facilitate support of the fabric cover in the bed and transport mounting positions. Resilient, tensile arms or stays can be positioned between the saddle arms and/or frame sections to further stretch and stabilize the fabric cover.

In some assembly configurations, a pivoting hard cover shell is attached to the pivoting frame sections. In the travel position, the shell can be pivoted to rest on the collapsed, overlying frame sections to cover cargo and the fabric cover piece. The hard shell can alternatively be pivoted to support the folding frame section when the frame sections are opened to the "bed" position.

The framework can be outfitted with a variety of auxiliary appliances. A handle frame section and an auxiliary caster wheel are particularly provided and can be mounted to permit manual or non-towed use. Alternatively, a battery powered linkage can be mounted to facilitate manual travel.

When configured for towing, a tow bar or tongue arm assembly mounts to the framework to provide a shock resistant towing by a bicycle or a motorized vehicle. A coupler at a forward end of the tow bar or tongue arm attaches to the tow vehicle. An aft end of the tow bar or tongue arm is secured to the vehicle. An intermediate resilient portion of the tow bar flexes to prevent/soften/isolate the transfer of travel stress from bumps, ruts and fits-and-starts at the tow vehicle from the cart as the cart is towed over rough terrain.

The tow bar or tongue arm is presently, resiliently biased for reciprocating/telescoping motion relative to the framework at a resilient coupler secured to the framework. The resilient coupler can comprise intervening resilient coupler pieces (e.g. spring(s), elastomer member(s), a pneumatic cylinder/piston or the like) that are secured to permit a reciprocating or telescoping motion and associated shock absorption.

A variety of alternative configurations and combinations of the foregoing features of the present inventive cart can be constructed. For example, the cart may be adapted to motorized vehicle towing. The cart may provide either a fabric or hard cover or may provide a hybrid cover. The cart may include a manual push/pull handle frame and/or an auxiliary caster wheel and/or a battery powered electric motor(s). The resilient, reciprocating tongue arm and resilient coupler may be mounted to either of the frame sections.

Still other objects, advantages, distinctions, constructions and combinations of individual features of the invention will become more apparent from the following description with respect to the appended drawings. Similar components and assemblies are referred to in the various drawings with similar alphanumeric reference characters. The description to each combination should therefore not be literally construed in limitation of the invention. It is also to be appreciated the singular improvements can be combined in any variety of cart assemblies. The invention should therefore be interpreted within the broad scope of the further appended claims.

DESCRIPTION OF THE PREFERRED EMBODIMENTS

Figure 1:
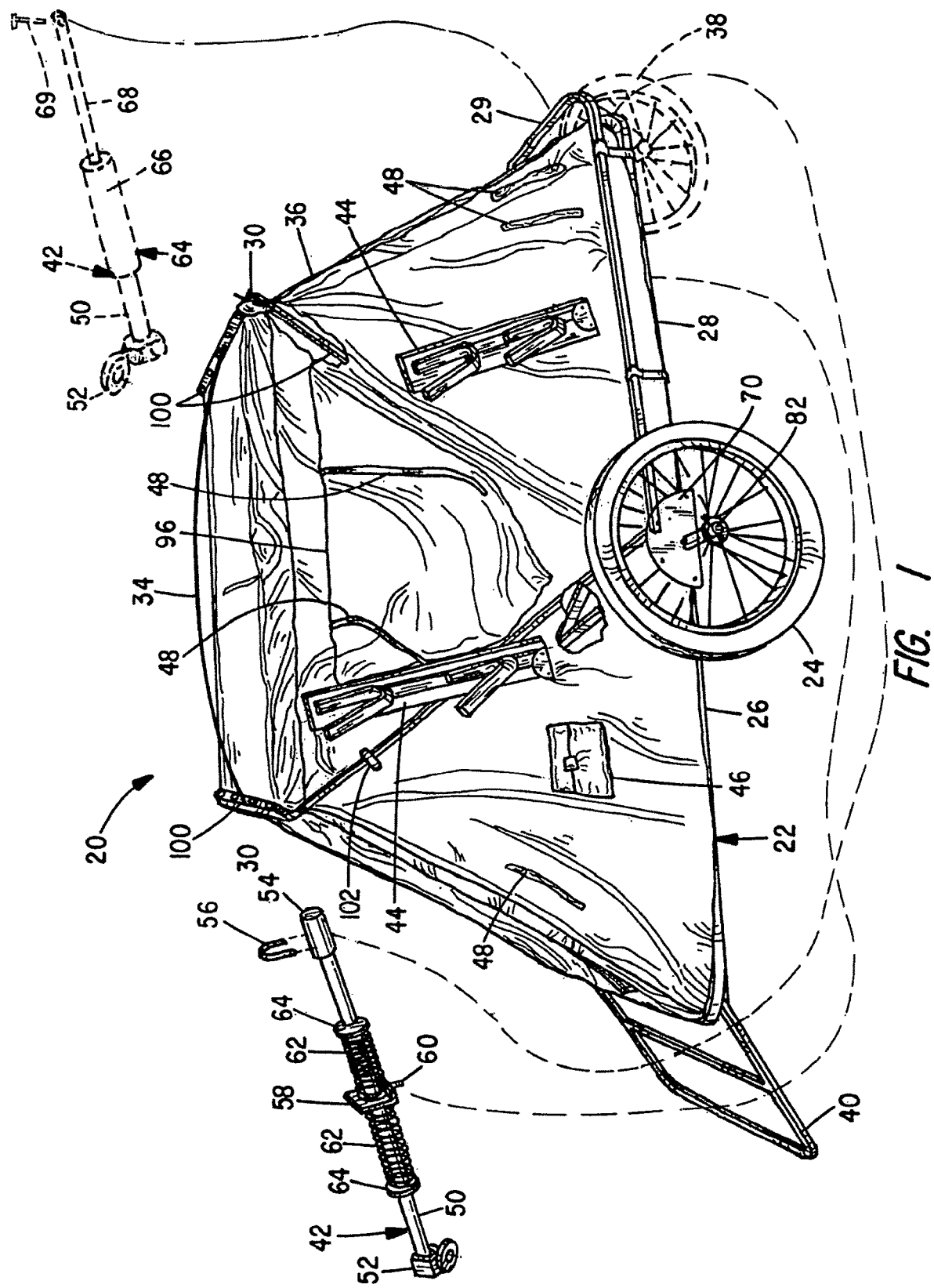
FIG. 1 shows a perspective view of a tent covered cart with the frame sections folded open to a sleeping position and relative to which alternative constructions of an auxiliary resilient tow bar or tongue arm and an auxiliary caster support wheel, push/pull handle frame section and firearm racks are shown that can be selectively attached to the frame sections.
Figure 2:
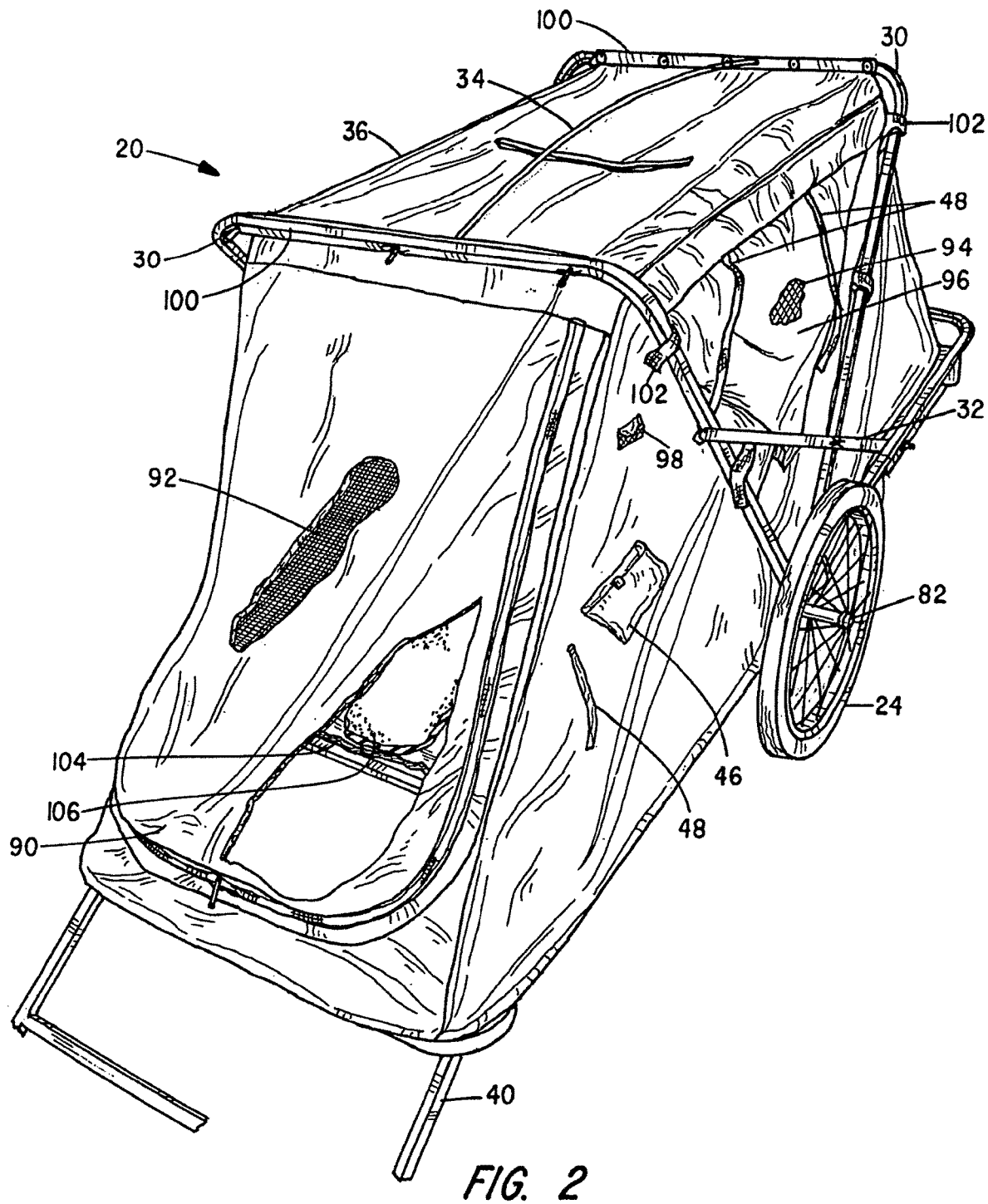
FIG. 2 shows a perspective view in partial cutaway of the cart of FIG. 1 with the frame sections folded open to the bed position and showing a zippered fabric door panel, fabric screen panel, fabric window and screen cover panel and various exterior appliances, interior support boards, and sleeping cushions.

With attention to the perspective view of FIGS. 1 and 2, a recreational travel trailer/cart 20 is shown. The cart 20 is adapted for manual and motorized or non-motorized towing/travel via a folding, multi-section framework 22 mounted to a pair of primary support wheels 24. The framework 22 is constructed of a first, forward folding frame section 26, a second, normally horizontal frame section 28 having upright rails 29, a pair of intermediate folding saddle arms 30, a pair of truss-type brace arms 32 and one or more stay or saddle spreader arms 34. The frame sections 26 and 28 and saddle arms 30 are mounted to pivot between several preferred mounting positions discussed in detail below. The mounting positions accommodate manual "camp" use or manual travel and towed travel of the cart 20 as discussed below. The brace and stay arms 32 and 34 judiciously support the frame sections 26 and 28 and an attached multi-panel fabric cover 36 in any mounting position. The stay arms 34 can be adjustable or resilient to insure a taught fabric.

Figure 3:
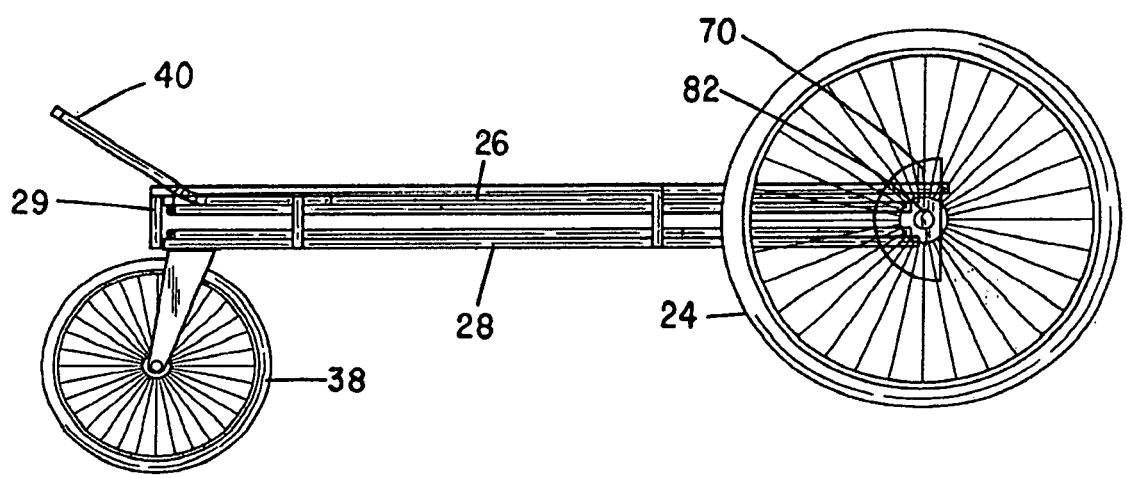
FIG. 3 shows a plan view of the cart framework of FIGS. 1 and 2 without the fabric cover piece and with the frame sections, saddle and brace arms configured and positioned in a flat condition for manual push/pull travel.
Figure 4:
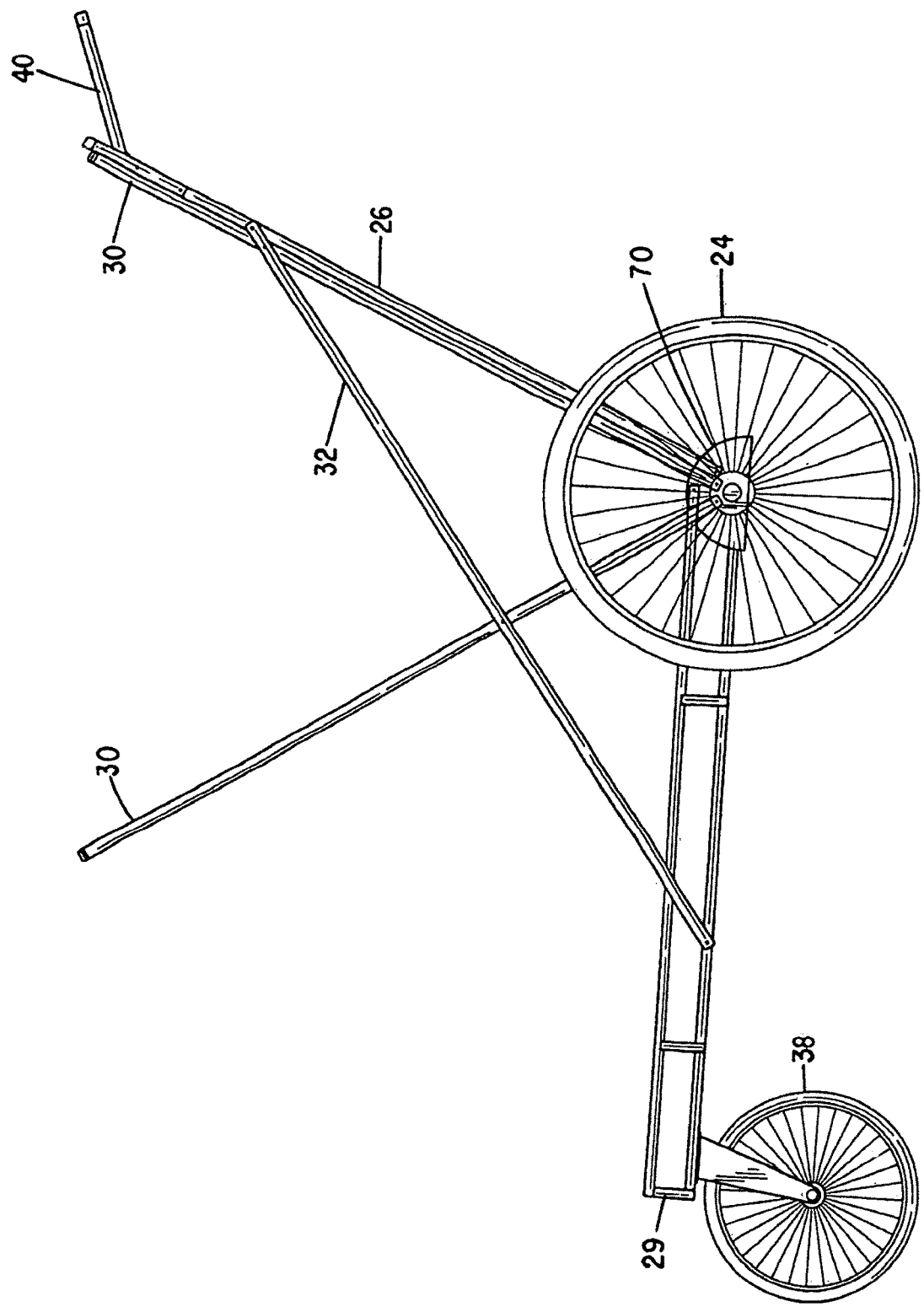
FIG. 4 shows a plan view of the cart framework of FIG. 3 with the frame sections and saddle and brace arms folded partially open to permit cargo storage and push/pull travel.
Figure 5:
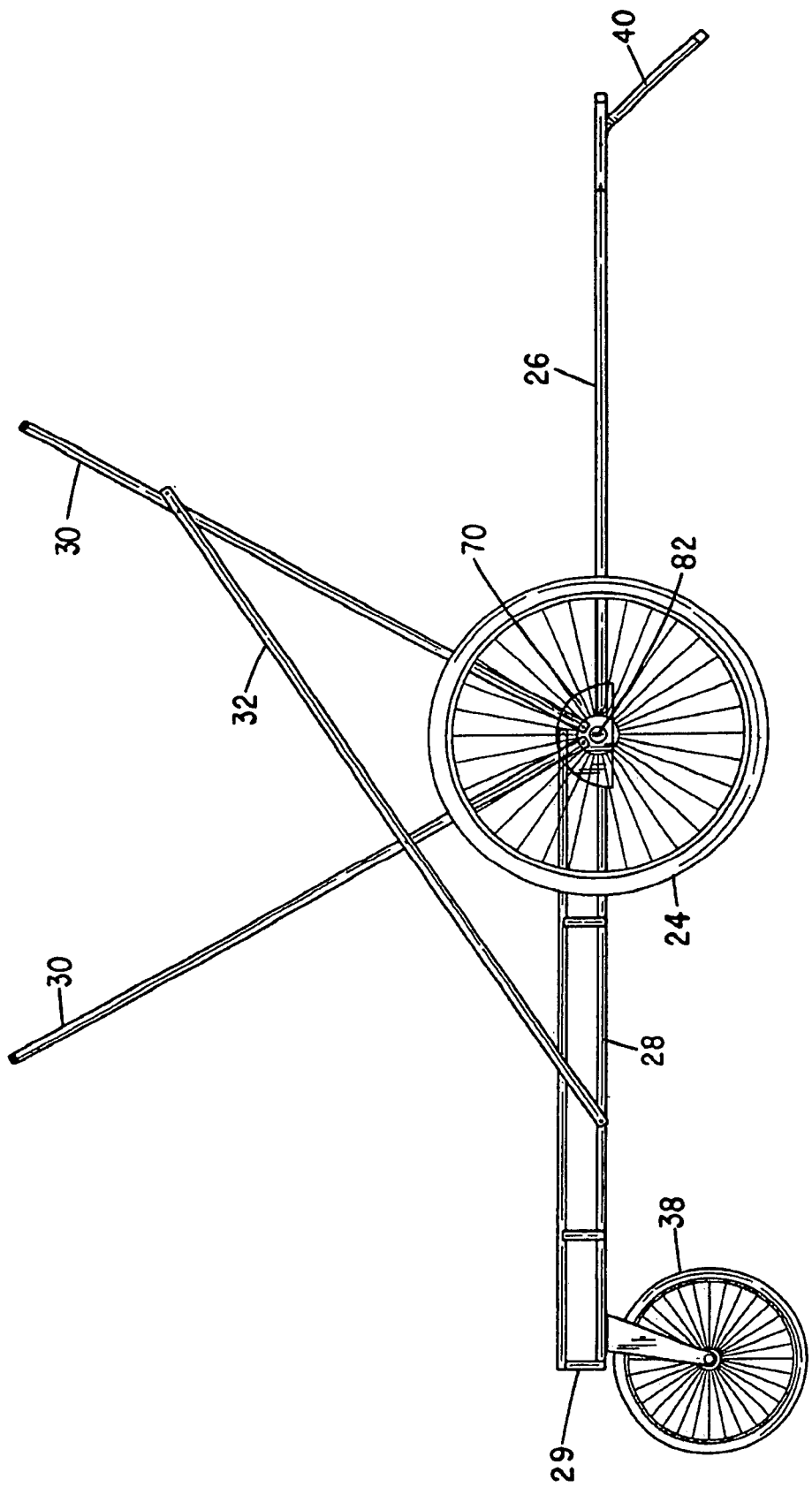
FIG. 5 shows a plan view of the cart framework of FIG. 3 with the frame sections, saddle and brace arms rotated flat to a sleeping position.

FIGS. 3, 4 and 5 respectively depict several preferred, predetermined mounting positions of the cart framework 22, sans the fabric cover 36, that accommodate stationary or limited manual movement of the cart 20, such as after being transported to a camp site or from the site over rugged trails. FIG. 3 depicts the cart framework 22 in a collapsed, flat folded condition and including an auxiliary caster wheel 38 attached to the aft end of the normally horizontal aft frame section 28. The caster wheel 38 is typically mounted to the framework 22 after being towed to a camp site. The caster wheel 38 can however remain attached during travel as discussed below. The caster wheel 38 supports the aft end of the horizontal frame section 28 and facilitates movement of the cart 20 about a camp site or adjacent environs during manual push/pull travel. The auxiliary wheel 38 also supports one end of the framework 22 when deployed to a sleeping position.

FIG. 4 depicts the cart framework 22 with the forward folding frame section 26 partially elevated for the storage of equipment and supplies beneath the cover 36. In the storage position, cargo is generally stored in a weatherproof fashion, supported on a platform secured to the horizontal frame section 28 beneath the fabric cover 36. Cargo might also be contained in weatherproof bags supported on the framework 22.

FIG. 5, along with FIGS. 1 and 2, depicts the cart framework 22 folded completely open to a bed or sleeping position and providing a weatherproof interior sleeping space having a foam-covered sleeping surface. In the bed position, the framework 22 is supported on the terrain by the wheels 24 and 38 and a manual push/pull handle 40 that mounts to the framework 22 and facilitates manual movement of the cart 20. The cart 20 thus provides a self-contained assembly adapted to camping/hunting/fishing recreational activities. The cart 20 facilitates transport of equipment and/or provides shelter and a sleeping space once moved to a camp site.

Firearm racks 44 and/or a variety of other support or storage structures, pockets or the like are shown fitted to the exterior surfaces of the cart 20. The firearm racks 44 or other hook or Velcro® hangers are provided to support equipment storage bags and/or other relatively heavy equipment from the saddle and brace arms 30 and 32. Pockets 46 or other tie or fastener straps 48 are shown that can be sewn or fastened (e.g. Velcro®, snaps, grommets, plastic/metal buckles etc.) to the fabric cover 36 to further augment the utility of the cart 20.

Manual travel is facilitated with the manual push/pull handle 40 that detachably mounts to the forward folding frame section 26. When the push/pull handle 40 is attached to the frame work 22, the auxiliary caster wheel 38 (shown in dashed line) is also typically attached. The handle frame 40 in combination with the primary travel wheels 24 and caster wheel 38 provide a tricycle type wheeled cart suspension. The cart 20 can thereby be manually pushed or pulled over the terrain or about a camp site via the supporting wheels 24 and 38.

Figure 7:
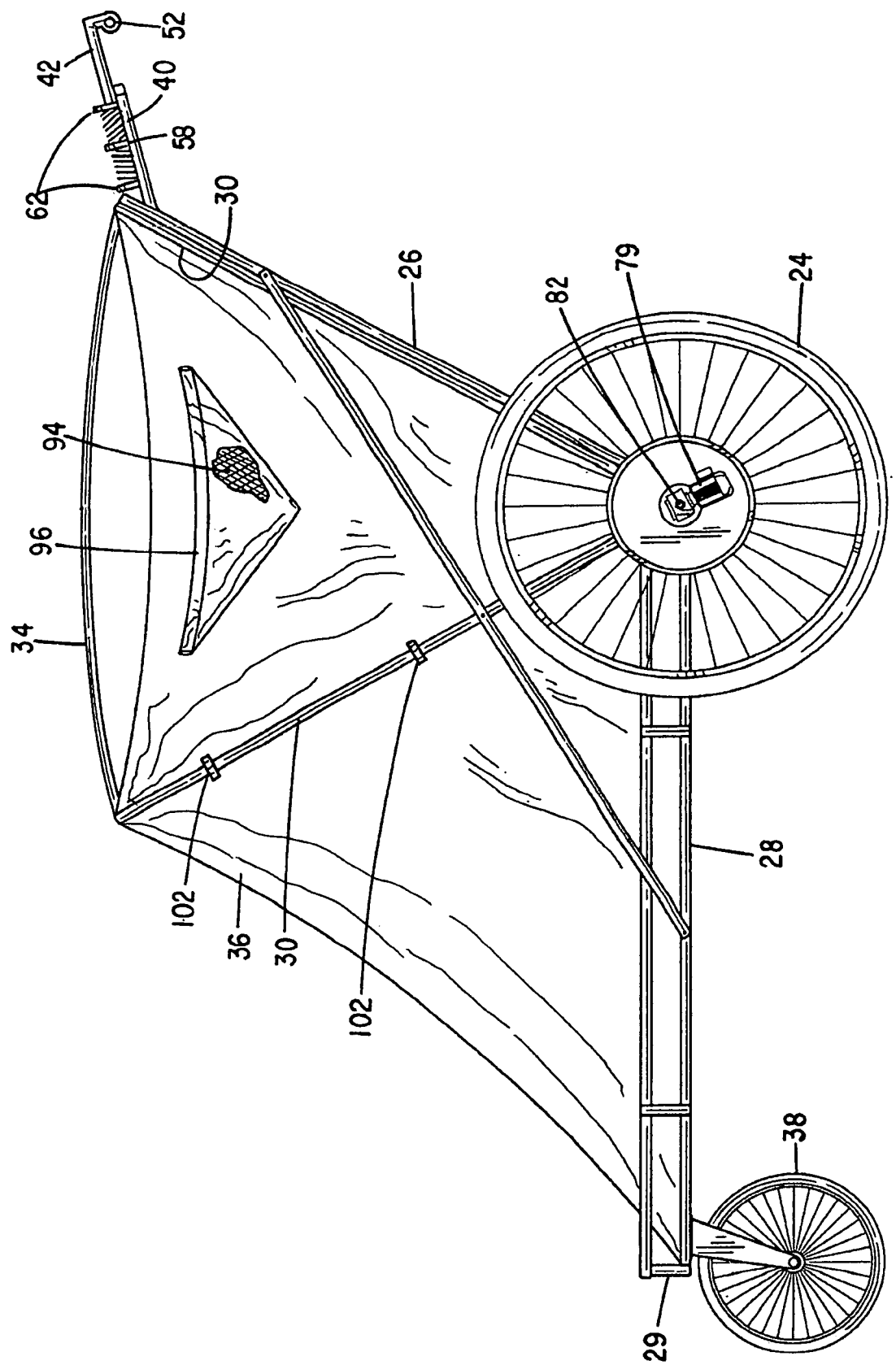
FIG. 7 shows a plan view of the cart framework of FIG. 6 with at least one battery powered electric motor mounted to drive the drive axle/wheels and with the frame sections, saddle and brace arms pivoted for manual push/pull travel.

FIG. 7 depicts the general configuration of the cart 20, when arranged for manual movement. In this configuration the folding frame section 26 is pivoted (e.g. 110° to 145° relative to the horizontal frame section 28) and secured into position with the aid of the brace arms 32 and stays 34. The handle frame 40 permits pushing or pulling the cart 20 over the terrain.

Also shown at FIG. 7 is a battery powered electric motor and drive linkage 79 that can be coupled to drive the axle 82 that supports the wheels 24. An associated control linkage, wiring and hand actuators (not shown) at the handle frame 40 enable the operator to facilitate cart travel up hills and over rugged patches. Alternatively, the motor 79 can be fitted to the auxiliary wheel 38.

The cart 20 is also adapted to be towed by a variety of vehicles. For example, and with continuing attention to FIG. 7, the cart 20 can be towed by a bicycle. To accommodate bicycle towing, the folding frame section 26 is pivoted (e.g. 110° to 145° relative to the horizontal frame section 28) and secured into position with the aid of the brace arms 32. A resilient tow bar or tongue arm assembly 42 can be attached to the handle frame 40. A forward end of the resilient tow bar assembly 42 is secured to a seat stem or other coupling member(s) provided at the bicycle frame (not shown). The tow bar assembly 42 is mounted to the handle frame 40 to depress the forward frame section 26 toward the terrain which elevates the aft horizontal frame section 28 and caster wheel 38 (if attached) away from contact with the terrain in the fashion of FIG. 6. The cart 20 can then towed via the resilient tongue arm assembly 42. The battery powered motor and linkage 79 can be deleted when the cart 20 is configured for bicycle towing.

Figure 8:
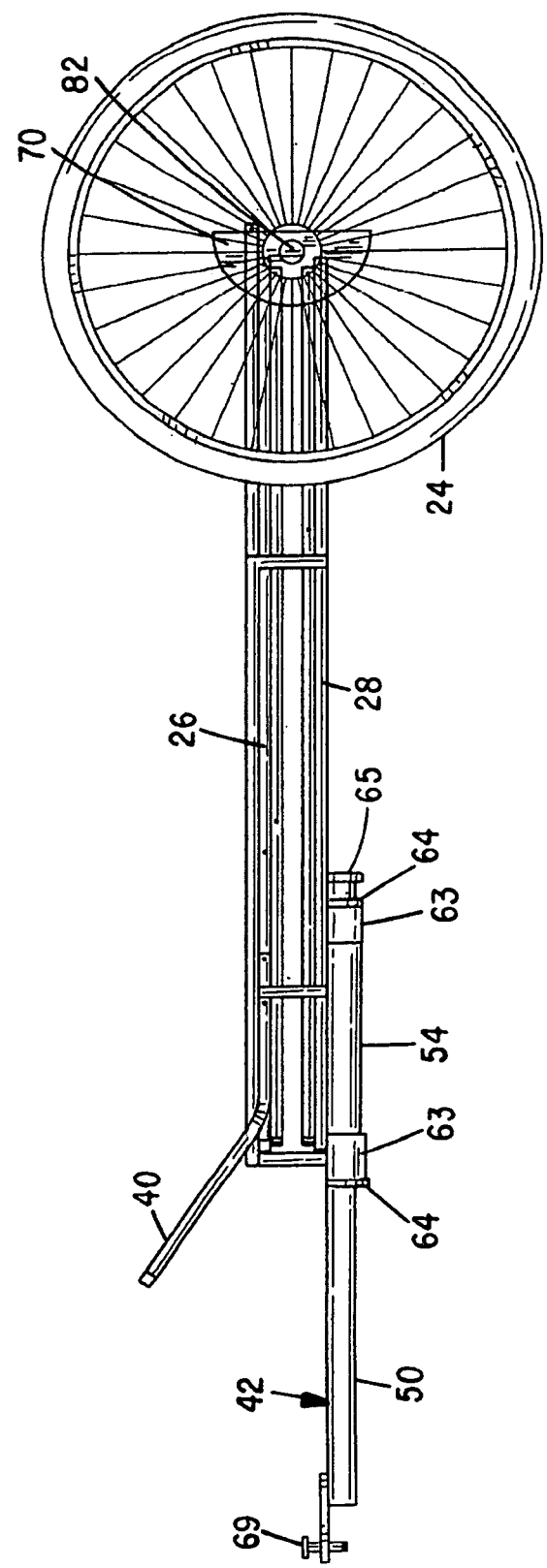
FIG. 8 shows a plan view of the cart framework similar to FIG. 3 collapsed for travel and with a resilient shock absorbing tow bar secured to the framework.

Alternatively, and with additional attention to FIG. 8, the framework 22 can be configured for motorized towing via a single or multi-passenger all-terrain vehicle (e.g. ATV or the like). A motorized tow position is accommodated by detaching the manual push/pull handle frame 40 and/or caster wheel 38 as necessary or desired to facilitate such towing. At FIG. 8 the framework 22 is collapsed or folded 180° to a substantially flat, parallel arrangement. The frame section 28 overlies the frame section 28 and captures the fabric cover 36 and any equipment supported on the frame section 28 between the two frame sections 26 and 28. The caster wheel 38 in turn is replaced with the resilient tongue arm assembly 42. That is, the resilient tongue arm assembly 42 is secured to the aft end of the horizontal frame section 28 in lieu of the caster wheel 38.

The forward folding frame section 26 may also be partially elevated relative to the horizontal frame section 28 (e.g. 110° to 145°) in the fashion of FIG. 7 for towing. In this tow position, cargo again is supported for limited motorized travel on the aft frame section 28 beneath the fabric cover 36. The cart 20 can then be towed via the tow vehicle and attached resilient tongue assembly 42. The resilient tow bar assembly 42 provides shock absorption and tows the cart 20 with minimal shock transfer, jostling and the like.

Figure 6:
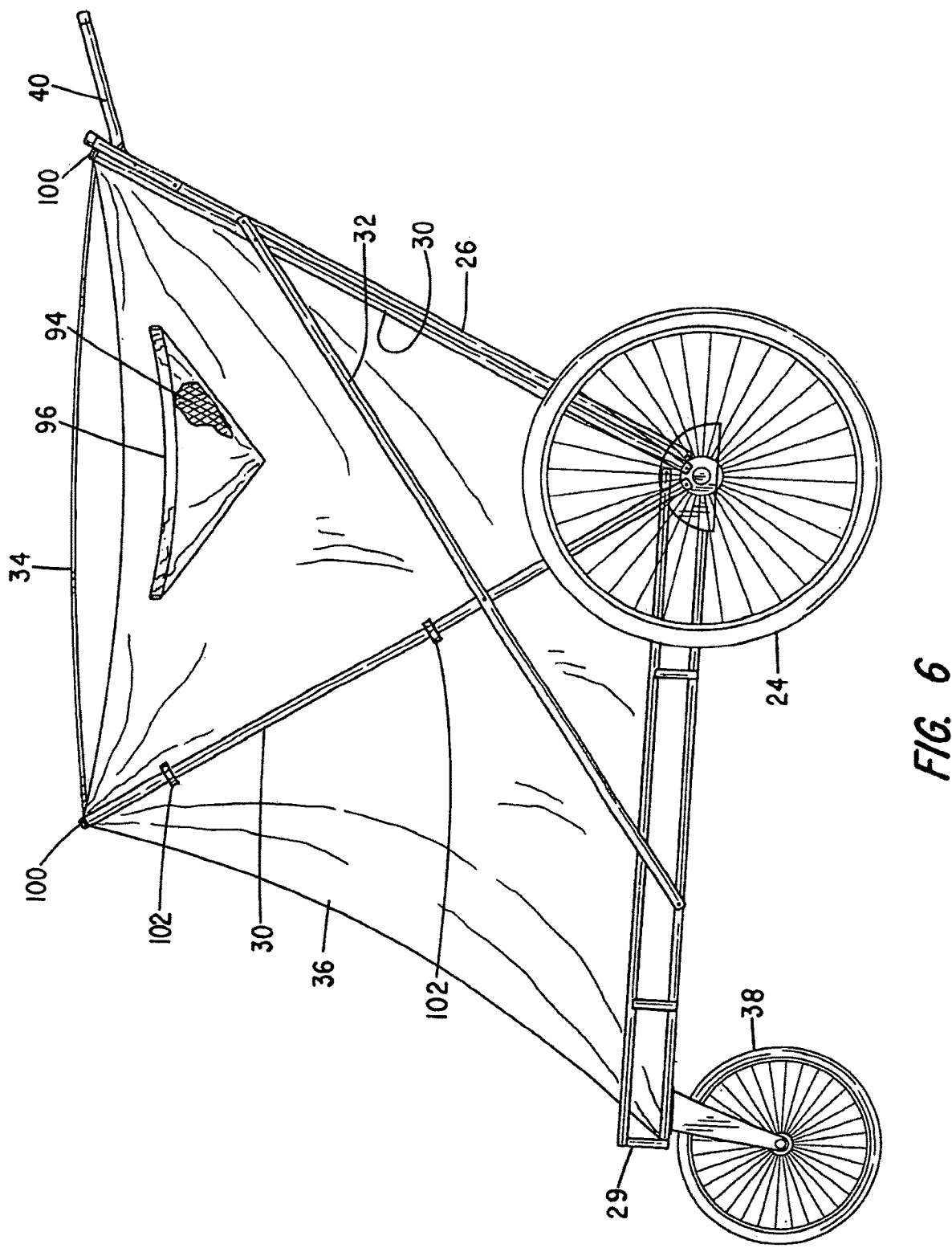
FIG. 6 shows a plan view of the cart framework similar to FIG. 4 with the tent cover and with the frame sections, saddle and brace arms and caster wheel elevated for manual push/pull travel.
Figure 12:
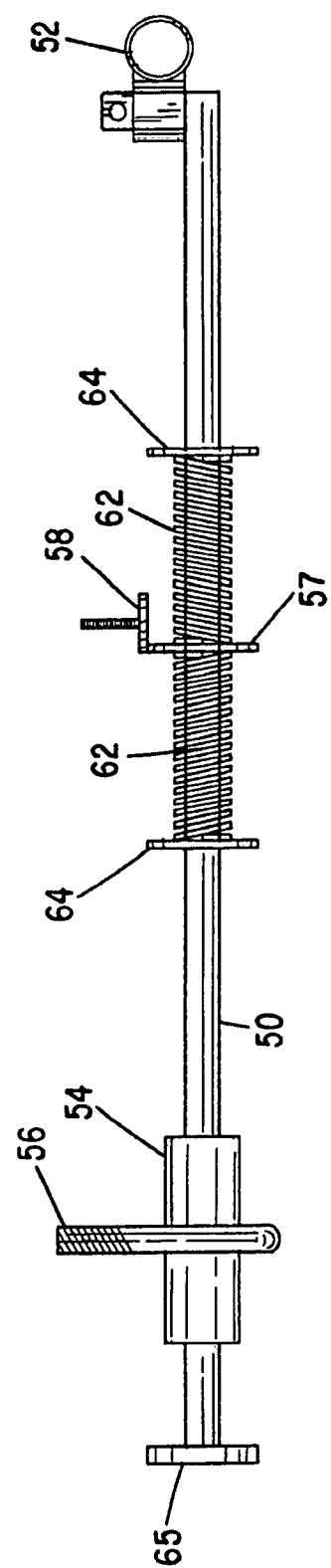
FIG. 12 shows a plan view of one construction of a reciprocating tow bar or tongue arm assembly, such as depicted in FIGS. 8 and 11, having a spring biased, telescoping shock dampener assembly that attaches the framework to a tow vehicle.

Cart travel in any of the towed travel positions of FIGS. 6 through 8 is particularly accommodated with the aid of the resilient tongue arm assembly 42. The tongue arm assembly 42 can take a variety of forms and alternative ones of which are shown in FIGS. 1, 8 and 12. Generally however the tow bar or tongue arm assembly 42 provides a reciprocating assembly having one or more moveable tow arms that cooperate with each other and an interconnected, intermediate resilient interface. Presently a resiliently biased, single arm is preferred although telescoping arms can be used such as described below in relation to a cylinder/piston version described below.

Support fasteners secure the tow bar assembly 42 to the framework 22 in a fashion that permits reciprocating or telescoping movement of the moveable arm relative to the framework 22. Intervening resilient members (e.g. springs, elastomer bushings, or pneumatic or hydraulic cylinders and pistons) absorb travel shock and stresses that otherwise might be transmitted through a conventional rigid tow bar or tongue arm.

FIG. 1 depicts two alternative constructions of the resilient tow bar or tongue arm assembly 42, one in solid-line and one in dashed-line. As noted above, the tow bar assembly 42 can be mounted to the push/pull handle frame 40 or alternatively to the aft end of the horizontal frame section 28.

With attention to the tow bar assembly 42 shown in solid line and in enlarged detail at FIG. 12, the tow bar assembly 42 provides a tow or tongue arm 50 having a coupler 52 secured to one end that is adapted to mate with the tow vehicle. The tow or tongue arm 50 is captured for reciprocating/telescoping movement in a sleeve 54 that is secured to the frames 40 or 28 with suitable fasteners (e.g. threaded U-bolts and nuts 56).

An L-shaped bracket piece 58 is also secured to the frame section 28 via a threaded stem 60. A pair of springs 62 are mounted on opposite sides of an upright flange 57 of the bracket 58. Stops or limit members 64 (e.g. welded washers) are mounted to the tow bar or tongue arm 50 and capture the springs 62 on either side of the flange 57 to the tow bar or tongue arm 50. The springs are secured to the flange 57 and the limit members 64. Reciprocating, to-and-fro movement of the tow bar or tongue arm 50 is restricted to the sleeve 54 and bracket 58 and is resisted by the springs 62 to provide shock absorption relative to the tow vehicle. An end stop 65 is secured to the end of the tow bar 50 to define the maximum range of movement of the tow bar 50.

Cart movement is thereby smoothed as the cart 20 travels over rough terrain. Supported cargo and the framework 22 are also spared from undue jostling and/or damage to the cargo. Although resilient springs 62 are shown, the tow or tongue arm 50 can be secured to cooperate with elastomer members 63, see FIG. 8. In this instance, the springs 62 are replaced with elastomer members 63 of suitable length and durometer to provide a suitable resistance or shock absorption to movement of the tow or tongue arm 50 as the elastomer members 63 compress and expand.

With attention to FIG. 8, a single, relatively long sleeve 54 is secured to the framework 22. Elastomer bushings 63 of suitable length, diameter and durometer are mounted to opposite sides of the sleeve 54 between end limits or stops 64. The resilience of the assembly 42 can be varied by appropriately changing the dimensions and/or durometer of the elastomer to vary the resistance to compression. Spacers (not shown) at the contact points of the members 63 with the sleeve 54 might also be included to reduce wear.

Similarly, another alternative tow bar or tongue arm assembly 42 is shown in dashed line at FIG. 1. This tow bar or tongue assembly 42 provides a pneumatic or hydraulic cylinder 64. One end of the cylinder 64 mounts to a coupler 52 secured to the tow vehicle and a piston 68 mounts to the cart 20 with a suitable coupler (e.g. lynch pin 69) to provide resilient shock absorption. In particular and as depicted at FIG. 1, the barrel 66 of the piston 64 is coaxially secured to the tow bar or tongue arm 50. The tow arm 50 can be deleted if the cylinder barrel 66 is of sufficient length. The piston 68 in turn is rigidly secured to the frame section 28 with a lynch pin 69 or other suitable fastening. Reciprocating movement of the tongue arm 42 is thereby cushioned by the interaction of the piston 68 with the pneumatic or hydraulic chamber(s) in the barrel 66 to reduce shock and smooth the travel movements of the cart 20. It is to be appreciated the barrel 66 can be secured to the frame section 28 with U-bolts/nuts 56 and the piston 68 can be secured to the tow vehicle with the coupler 52.

Figure 9:
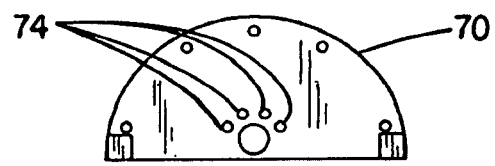
FIG. 9 shows a plan view of one side of the cart's opposed axle hinge plates mounted to a pair of parallel interconnecting cross arms.
Figure 10:
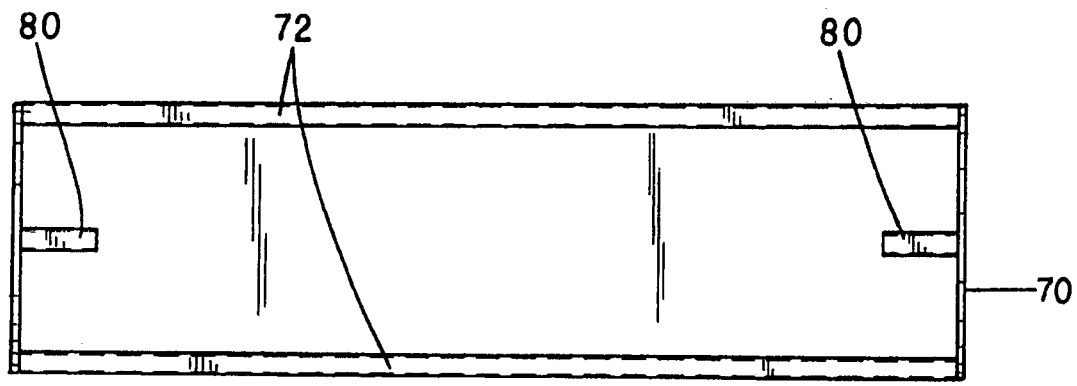
FIG. 10 shows an assembled top plan view of the axle plates mounted to a pair of cross arms that parallel intermediate axle support sleeve bushings.
Figure 11:
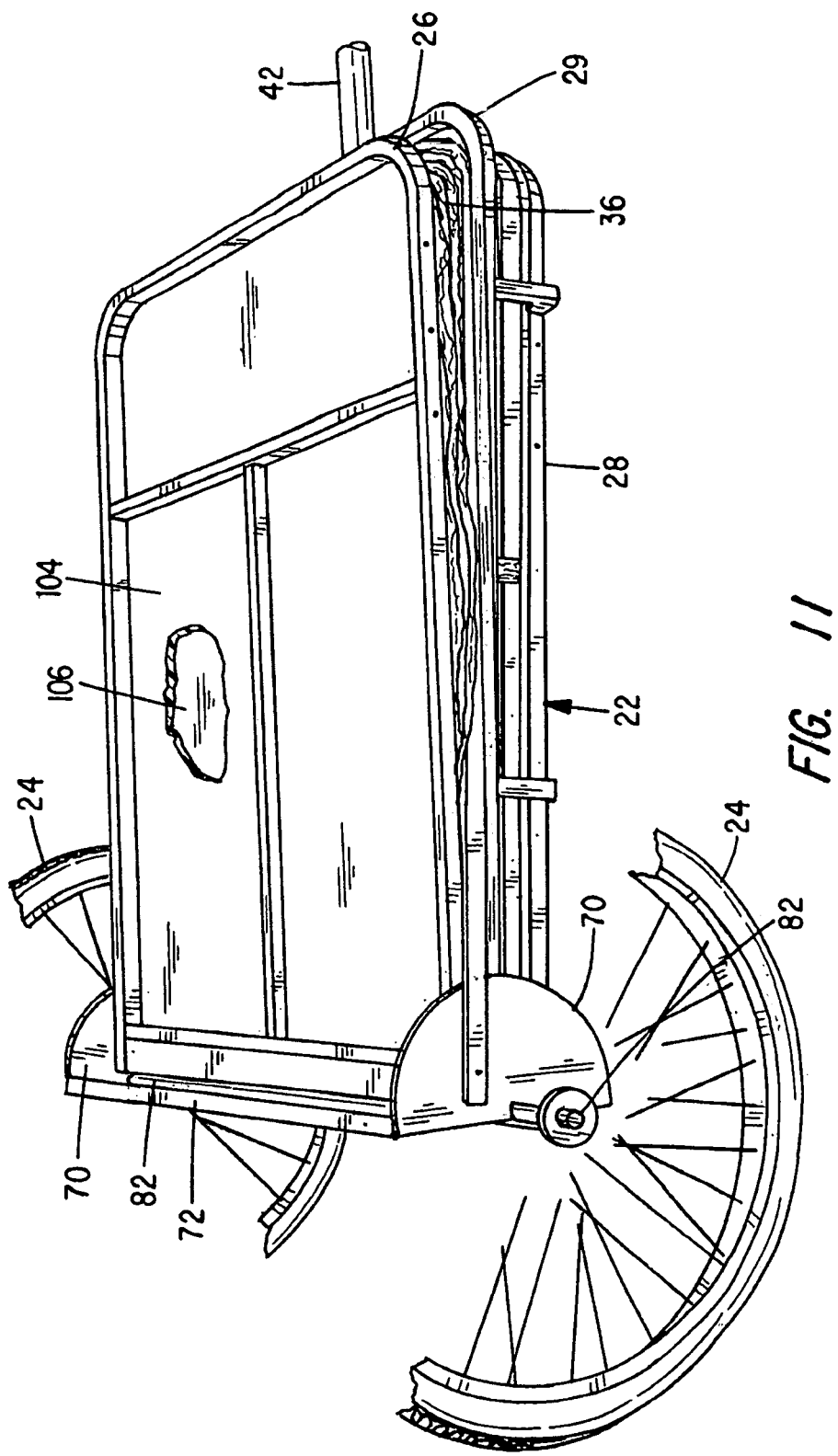
FIG. 11 shows a perspective view in partial cutaway to the axle hinge plates, cross axle, and cross arms relative to the folded frame sections and shock absorbing tow bar or tongue arm.
Figure 13:
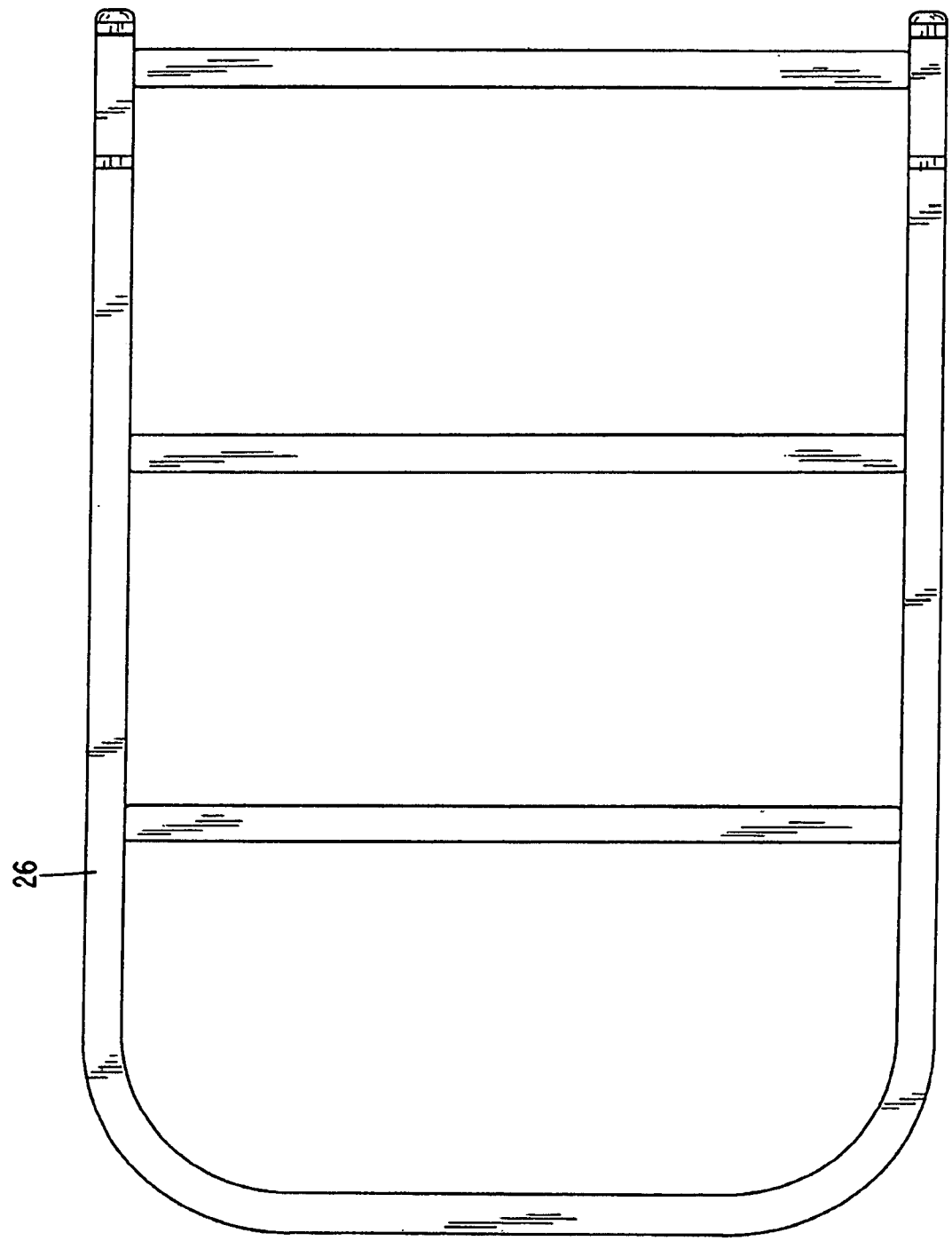
FIG. 13 shows a plan view of the aft folding frame section removed from the cart.
Figure 14:
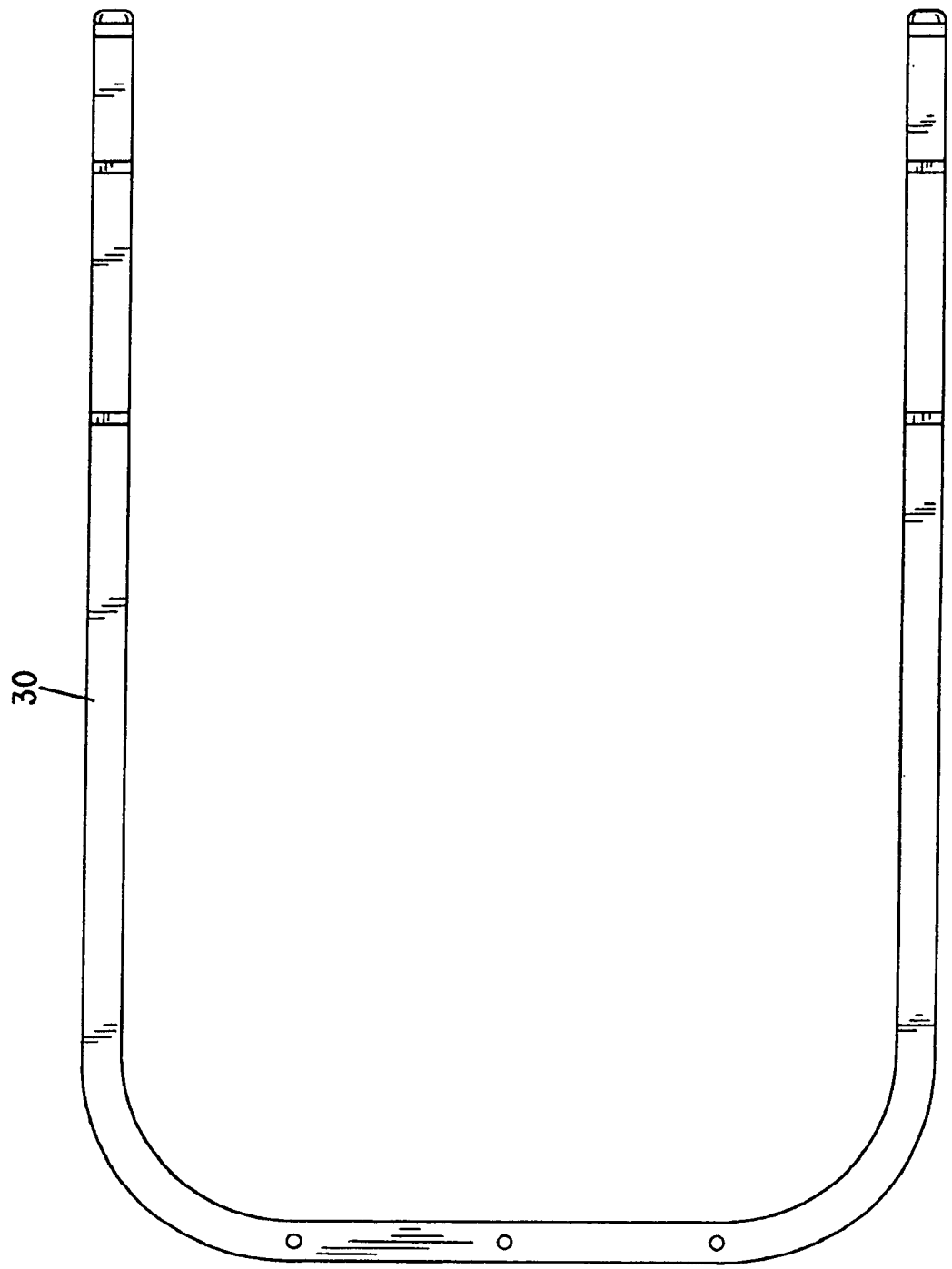
FIG. 14 shows a plan view of the intermediate folding U-shaped saddle frame section removed from the cart.
Figure 15:
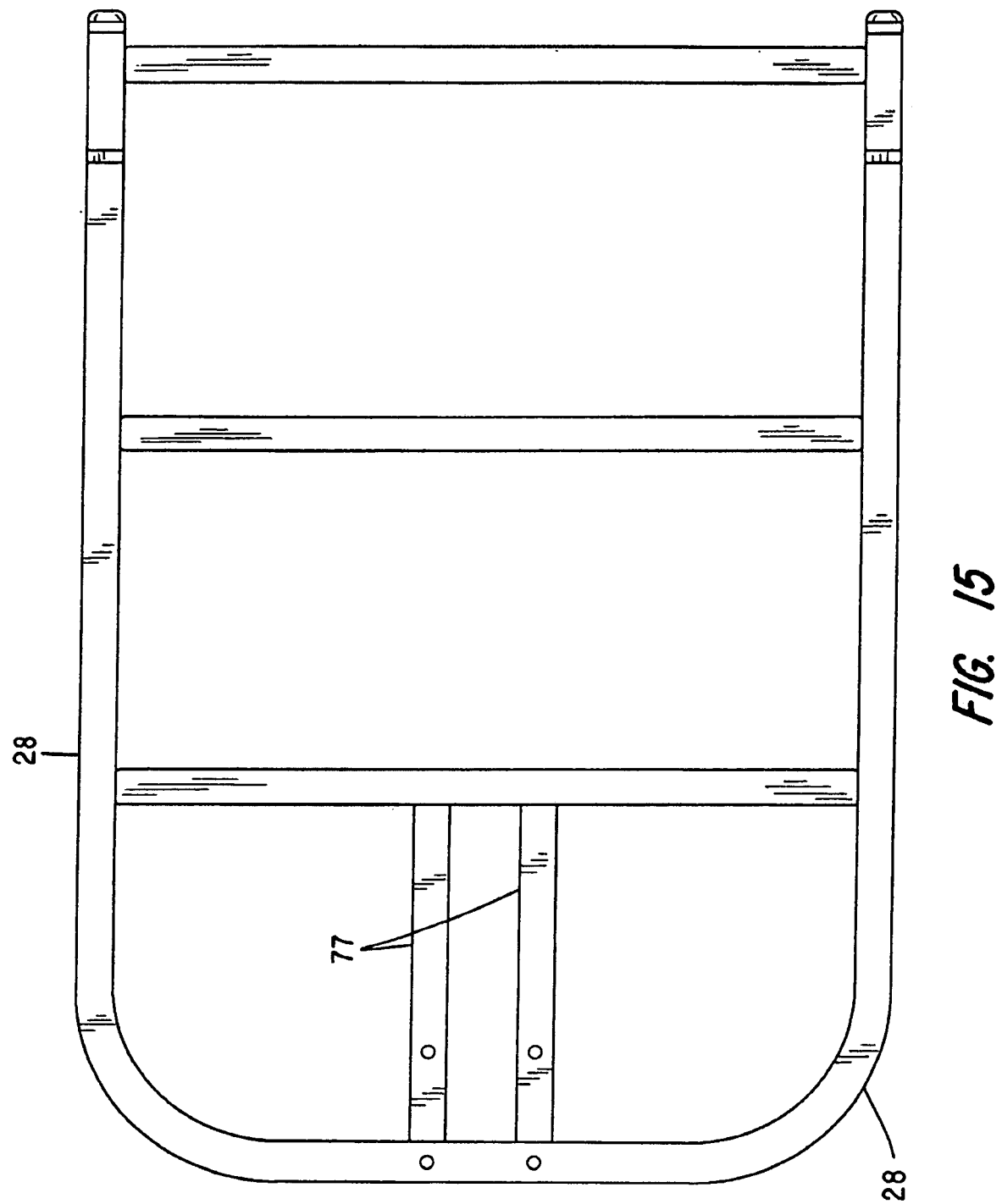
FIG. 15 shows a plan view of the forward platform support frame section removed from the cart and to which an auxiliary wheel and the tow bar assembly mount.

Relative rotational movement of the frame sections 26 and 28 and saddle arms 30 are determined by first and second axle support members, also referred to as axle or pivot plates 70 that are respectively mounted on opposed left and right sides of the framework 22. FIGS. 9, 10 and 11 depict the construction and orientation of the pivot/axle plates 70 relative the frame sections 26 and 28 and saddle arms 30. The axle plates 70 are separated by cross-brace arms 72 that extend between the axle plates 70. Each axle plate 70 exhibits an arcuate, half-moon shape and is formed with a number of inner bores 74. Ends of the frame sections 26 and 28 and saddle arms 30 are secured to the bores 74 with appropriate pivot fasteners 76 (e.g. threaded bolts with smooth shoulders or lynch pins). FIGS. 13, 14 and 15 depict details to the construction of the frame sections 26 and 28 and saddle arms 30. The frame section 28 differs slightly from the frame section 26 by providing reinforced mounting members that support the attachments of the caster wheel 38 and tongue assembly 42.

The frame section 26 rotates about the fasteners 76 relative to the axle plate 70 and frame section 28. The previously described stationery and travel positions of the frame sections 26 and 28 and saddle arms 30 is determined at the axle plates 70 via an outer set of bores 78. Spring pins or bolts and wing nuts mount through the outer bores 78 and the frame sections 26 and 28 and saddle arms 30 to fix the mounting positions of one to the other as discussed above.

The cross-brace arms 72 extend between the ends of the axle plates 70 and span the width of the cart 20. Axle bushing sleeves 80 project from the axle plates 70 and concentrically support a through axle 82 to the axle plates 70 in parallel with the cross-brace arms 72. The axle plates 70 and attached cross-brace arms 80 thereby rotate with the pivoting/folding movements of the frame sections 26 and 28. Collectively the axle plates 70 and cross-brace arms 72 provide a durable support for the wheels 24. The cross-brace arms 72 not only stabilize the axle plates 70 but also advantageously protect the axle 82 from rocks and other terrain irregularities that can damage or bend the axle 82. That is, when the cart 20 is folded for towed travel in the fashion of FIG. 3, 8, 11 or 16, the cross-brace arms 72 are rotated to lie close to the terrain and protect the axle 82 from encountered rocks and other projections.

Returning attention to FIGS. 1 and 2, details to the fabric cover 36 are apparent. To accommodate sleeping, the cover 36 is designed in the fashion of a tent. The cover 36 provides a zippered solid panel door 90, zippered screen door 92 and side screen or vinyl window panels 94 and associated cover flaps 96. One or more screen vents 98 can be arrayed about the cover 36 to enhance air flow and prevent fogging at the vinyl window panels 94.

The fabric cover 36 is secured to the framework 22 at a number of tubular sleeves 100 that are sewn to seams between panels of the cover 36. Associated Velcro® loops and tabs 102 arrayed about the cover 36 assure retention of the cover 36 to the framework 22 and door 90 and/or window flaps 96 to the cover 36. The fabric panels secured to the frame sections 26 and 28 and saddle arms 30 are held taught by placing the resilient stay arms 34 between the saddle arms 30. The stay arms 34 mount in a bowed condition to stretch the fabric. The brace arms 32 are secured with threaded fasteners and wing nuts to maintain the angular orientations of the frame sections 26, 28 and saddle arms 30 once fixed to the saddle arms 30 and support frame section 28.

With additional attention to FIG. 11, boards or other suitable flat members 104 are mounted to cover the longitudinal and cross members of the frame sections 26 and 28 in the interior space. Foam cushioning 106 is applied over the members 104. The cushioning 106 can be affixed to the members 104 or can be rolled and lashed during travel along with any other bedding stored beneath the cover 36 during travel.

Figure 16:
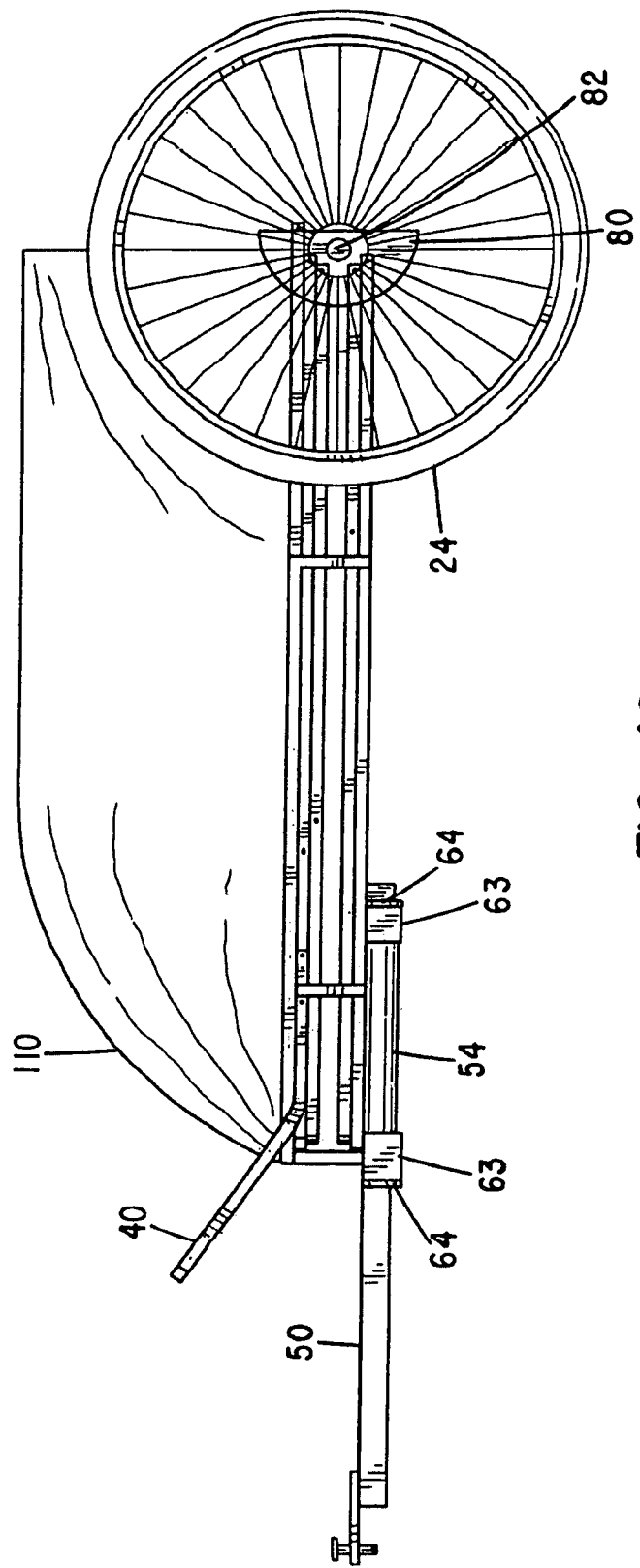
FIG. 16 shows a plan view of the cart framework, saddle and brace arms folded flat and fitted with a hard-sided travel cover.
Figure 17:
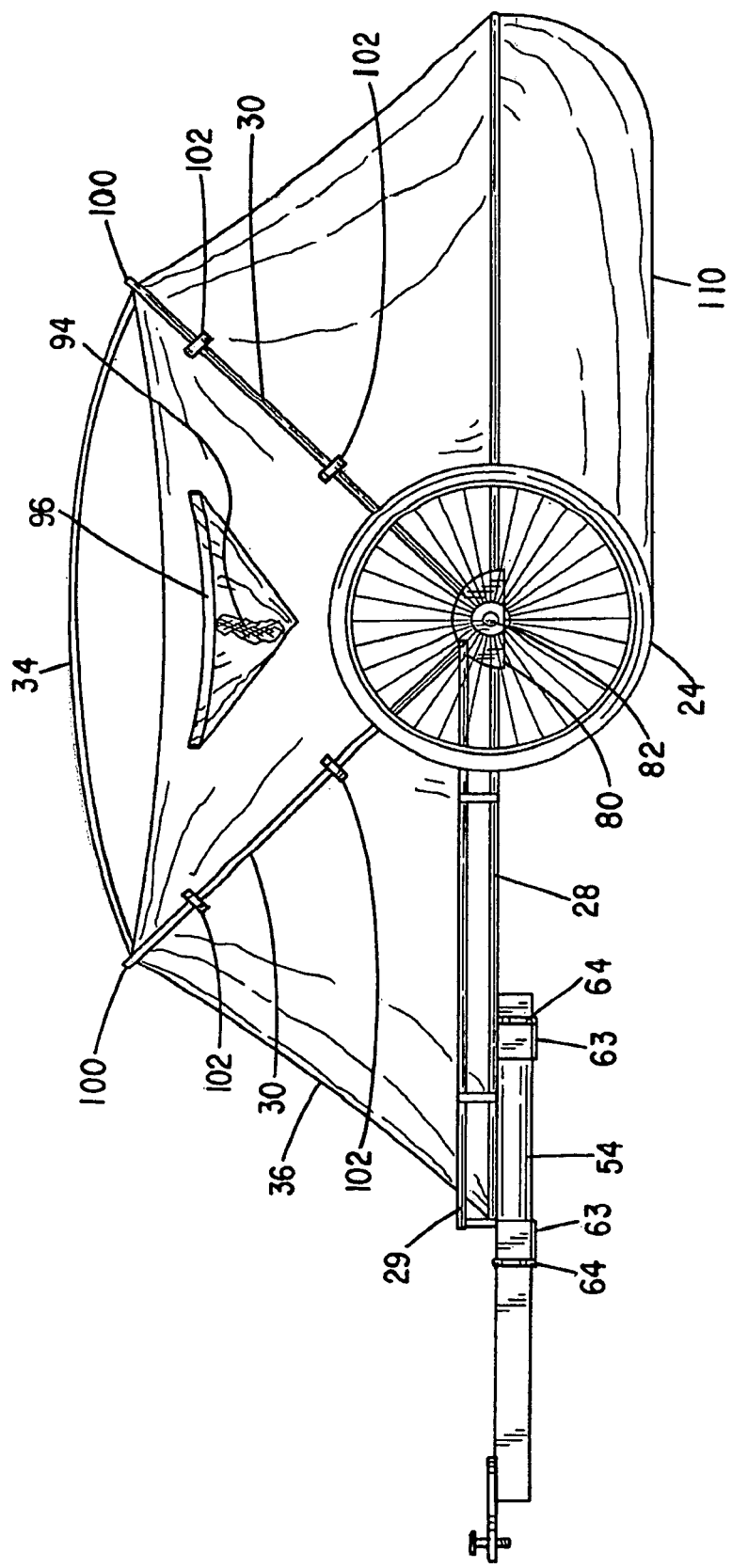
FIG. 17 shows a plan view of the cart framework of FIG. 16 with the frame sections, saddle and brace arms folded open and flat for sleeping and with the hard travel cover rotated beneath the aft platform support frame section for support.

To further accommodate towing of the cart 20 at highway speeds, such as via a motorcycle, FIGS. 16 and 17 depict the cart 20 outfitted with a hard cover 110. The cover 110 can be constructed from metal, plastic or fiberglass. The cover 110 provides an aerodynamic shape that accommodates the higher travel speeds. The cover 110 is attached to the axle plates 80 and adapted to rotate about the axle 82 with the frame section 26 to cover the frame section 28 and fabric cover 36 when collapsed completely flat for travel. Upon rotating the frame section 180° to a fully open, sleeping position relative to the frame section 28, the cover 110 rotates to rest on the ground and provides support for the frame section 26.

While the invention has been described with respect to a presently preferred assembly and considered improvements, modifications and/or alternatives thereto, still other assemblies and arrangements may be suggested to those skilled in the art. It is therefore to be appreciated that the features of the foregoing cart assembly can be arranged in different combinations to accommodate a variety of differing constructions. The physical size of the cart can also be modified to accommodate multiple sleepers. The foregoing description should therefore be construed to include all those embodiments within the spirit and scope of the following claims.

What is claimed is:

1. A travel cart framework comprising:
a) first and second frame sections, each of said first and second frame sections comprised of a plurality of interconnected members arranged in a planar configuration;
b) first and second axle support members coupled to said first and second frame sections, wherein at least one of said first and second frame sections is coupled to pivot at said first and second axle support members between multiple predetermined relative angular orientations to each other, including a first position whereat said first frame section is collapsed onto and overlie said second frame section in parallel relation, a second position wherein the first frame section is pivoted in the range of 110° to 145° relative to the second frame section, and a third position whereat said first frame section is pivoted 180° to align co-planar with said second frame section;
c) an axle mounted to said first and second axle plates and to first and second wheels mounted to rotate about opposite ends of said axle; and
d) a tow bar secured to one of said first and second frame sections and including a coupler adapted to mount to a tow vehicle.

2. Apparatus as set forth in claim 1 wherein said tow bar is mounted to extend and retract and including resilient means for resiliently biasing the tow bar to resist reciprocating tow bar movements and absorb towing movement shock between said cart and tow vehicle.

3. Apparatus as set forth in claim 2 including a rigid member mounted to the second frame section, wherein said tow bar is mounted to permit reciprocating movement relative to said rigid member, and wherein said resilient means resiliently resists reciprocating movement of the tow bar.

4. Apparatus as set forth in claim 3 wherein said resilient member is coaxially mounted to said tow bar and interacts with said rigid member.

5. Apparatus as set forth in claim 4 wherein said resilient member comprises first and second springs mounted on opposite sides of said rigid member such that reciprocating movement of said tow bar is expansively and compressively resisted.

6. Apparatus as set forth in claim 5 wherein said resilient member comprises first and second elastomer bushings.

7. Apparatus as set forth in claim 1 including first and second cross members interconnected to said axle plates on opposite sides of and in parallel with said axle.

8. Apparatus as set forth in claim 2 wherein said resilient means comprises a pneumatic or hydraulic cylinder and piston.

9. Apparatus as set forth in claim 3 including,
   a) first and second U-shaped saddle arms mounted to pivot at said first and second axle plates independently of said first and second frame sections; and
   b) a brace arm adapted to fasten to said first and second frame sections and one of said first and second saddle arms to retain said first and second frame sections and first and second saddle arms in a predetermined fixed angular displacement at the second position.

10. Apparatus as set forth in claim 9 including a cover comprised of a plurality of panels fastened to one another and to said saddle arms and further secured in overlying relation to said to first and second frame sections and further including first and second platforms mounted to cover said first and second frame sections, whereby an interior space is defined beneath said cover and above said first and second platforms.

11. Apparatus as set forth in claim 10 wherein said cover comprises a plurality of fabric panels attached to one another and including a resiliently flexible stay arm mounted between said first and second saddle arms to displace said saddle arms and maintain a taught condition at the panels of said fabric cover.

12. Apparatus as set forth in claim 10 wherein said cover includes a door panel and a fastener secured to said cover to selectively expose and permit access to the interior space beneath said cover for storing cargo or permit sleeping in said third position.

13. Apparatus as set forth in claim 9 including a handle frame mounted to the first frame section and an auxiliary wheel mounted to said second frame section opposite the first and second wheels.

14. Apparatus as set forth in claim 1 including at least one battery powered electric motor and a control linkage coupled thereto and operative to rotate said first and second wheels.

15. A travel cart framework comprising:
   a) first and second frame sections, each of said first and second frame sections comprised of a plurality of interconnected members arranged in a planar configuration;
   b) first and second axle support members coupled to said first and second frame sections, wherein at least one of said first and second frame sections is coupled to pivot at said first and second axle support members between multiple predetermined relative angular orientations to each other, including a first position whereat said first frame section is collapsed onto and overlies said second frame section in parallel relation and a second position whereat said first frame section is pivoted 180° to align co-planar with said second frame section;
   c) an axle mounted to said first and second axle support members and to first and second wheels mounted to rotate about opposite ends of said axle;
   d) a cover adapted to maintain a taught, tent-like condition when said first and second frame sections are deployed to said second position whereat said cover shelters an interior space overlying said first and second frame sections; and
   e) a tow arm secured for reciprocating movement relative to one of said first and second frame sections and including a coupler adapted to mount to a tow vehicle and further including a resilient member coupled to said tow arm to resiliently resist relative motion between said tow arm and the one of said first and second frame sections, whereby shock is absorbed and not transferred to said cart during towing.

16. Apparatus as set forth in claim 15 wherein said resilient member comprises at least one spring or elastomer member collinearly mounted to said tow arm.

17. Apparatus as set forth in claim 15 wherein the first frame section is pivoted in the range of 110° to 145° relative to the second frame section, wherein a handle frame section is mounted to said first frame section and including at least one battery powered electric motor and linkage mounted to rotate said first and second wheels.

18. Apparatus as set forth in claim 15 wherein said cover comprises a convex cover secured to said first frame section to overlie and shelter said second frame section in said second position and to rest on the terrain and support said first frame section in said second position.

19. A travel cart framework comprising:
   a) first and second frame sections, each of said first and second frame sections comprised of a plurality of interconnected members arranged in a planar configuration;
   b) first and second axle support members coupled to said first and second frame sections, wherein said first frame section is coupled to pivot between multiple predetermined relative angular orientations, including a first position whereat said first frame section is collapsed onto and overlies said second frame section in parallel relation and a second position whereat said first frame section is pivoted 180° to align co-planar with said second frame section;
   c) an axle mounted to said first and second axle support members and to first and second wheels mounted to rotate about opposite ends of said axle and including first and second cross members secured to said first and second axle support members in parallel with and on opposite sides of said axle;
   d) a cover secured to said first and second frame sections and adapted to deploy and overlie and shelter said first and second frame sections in said second position and define an interior storage or sleeping space; and
   e) a tow arm secured for reciprocating movement relative to one of said first and second frame sections and including a coupler adapted to mount to a tow vehicle and further including a resilient member coupled to said tow arm to resiliently resist relative motion between said tow arm and the one of said first and second frame sections, whereby shock is absorbed and not transferred to said cart during towing.

20. Apparatus as set forth in claim 19 wherein said resilient member comprises a spring, an elastomeric member or a cylinder and piston.

* * * * *